(12) United States Patent
Beuterbaugh et al.

(10) Patent No.: US 10,738,237 B2
(45) Date of Patent: *Aug. 11, 2020

(54) METHODS, TREATMENT FLUIDS AND SYSTEMS FOR DIFFERENTIAL ACIDIZING OF A SILICEOUS MATERIAL

(71) Applicant: Halliburton Energy Services, Inc., Houston, TX (US)

(72) Inventors: Aaron M. Beuterbaugh, Spring, TX (US); Enrique Antonio Reyes, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/754,048

(22) PCT Filed: Sep. 30, 2015

(86) PCT No.: PCT/US2015/053161
§ 371 (c)(1),
(2) Date: Feb. 21, 2018

(87) PCT Pub. No.: WO2017/058193
PCT Pub. Date: Apr. 6, 2017

(65) Prior Publication Data
US 2018/0251673 A1 Sep. 6, 2018

(51) Int. Cl.
*E21B 43/26* (2006.01)
*C09K 8/72* (2006.01)
(Continued)

(52) U.S. Cl.
CPC .............. *C09K 8/72* (2013.01); *C09K 8/528* (2013.01); *C09K 8/70* (2013.01); *C09K 8/76* (2013.01); *E21B 43/26* (2013.01)

(58) Field of Classification Search
None
See application file for complete search history.

(56) References Cited

U.S. PATENT DOCUMENTS 6,506,711 B1  1/2003  Shuchart et al.
7,059,414 B2  6/2006  Rae et al.
(Continued)

OTHER PUBLICATIONS

International Search Report and Written Opinion from PCT/US2015/053161, dated Sep. 8, 2016, 11 pages.

*Primary Examiner* — Andrew Sue-Ako
(74) *Attorney, Agent, or Firm* — Thomas Rooney; C. Tumey Law Group PLLC (57) ABSTRACT

The rapid reaction of hydrofluoric acid with siliceous materials can make it difficult to increase the permeability of subterranean formations containing siliceous minerals. Methods for stimulating a subterranean formation can comprise: providing a latent hydrofluoric acid composition comprising a degradable matrix, and a hydrofluoric acid precursor dispersed in the degradable matrix; introducing a first treatment fluid containing the latent hydrofluoric acid composition in a non-dissolved form into a wellbore penetrating a subterranean formation comprising a siliceous material; differentially depositing the latent hydrofluoric acid composition upon a portion of the siliceous material in one or more locations; degrading at least a portion of the degradable matrix, thereby exposing at least a portion of the hydrofluoric acid precursor; converting the exposed hydrofluoric acid precursor into hydrofluoric acid; and reacting the hydrofluoric acid with the siliceous material where the latent hydrofluoric acid composition was deposited.

18 Claims, 2 Drawing Sheets

(51) Int. Cl.
    *C09K 8/528*     (2006.01)
    *C09K 8/70*     (2006.01)
    *C09K 8/76*     (2006.01)

(56) References Cited

U.S. PATENT DOCUMENTS

| | | |
|---|---|---|
| 7,431,089 B1 | 10/2008 | Couillet et al. |
| 8,789,596 B2 | 7/2014 | Curtis et al. |
| 10,053,621 B2 * | 8/2018 | Fontenelle ............... C09K 8/92 |
| 2005/0034861 A1 | 2/2005 | Saini et al. |
| 2005/0113263 A1 | 5/2005 | Brown et al. |
| 2006/0054325 A1 | 3/2006 | Brown et al. |
| 2006/0058197 A1 | 3/2006 | Brown et al. |
| 2007/0235189 A1 * | 10/2007 | Milne ...................... C09K 8/74 |
| | | 166/280.1 |
| 2008/0139416 A1 * | 6/2008 | Rimassa ................ C09K 8/508 |
| | | 507/241 |
| 2008/0182761 A1 | 7/2008 | Stephenson et al. |
| 2008/0314594 A1 * | 12/2008 | Still ......................... C09K 8/72 |
| | | 166/307 |
| 2009/0156433 A1 | 6/2009 | Mebratu et al. |
| 2010/0319915 A1 | 12/2010 | Bustos et al. |
| 2012/0067581 A1 * | 3/2012 | Auzerais ............. C04B 40/0633 |
| | | 166/308.1 |
| 2013/0192839 A1 | 8/2013 | Brown et al. |
| 2018/0251672 A1 * | 9/2018 | Beuterbaugh ............ C09K 8/72 |

\* cited by examiner

METHODS, TREATMENT FLUIDS AND SYSTEMS FOR DIFFERENTIAL ACIDIZING OF A SILICEOUS MATERIAL

BACKGROUND

The present disclosure generally relates to subterranean stimulation operations and, more specifically, to treatment fluids and methods for acidizing a siliceous material.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof will refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include, for example, drilling operations, fracturing operations, gravel packing operations, acidizing operations, scale dissolution and removal operations, sand control operations, consolidation operations, and the like.

Acidizing operations may be used to stimulate a subterranean formation to increase production of a hydrocarbon resource therefrom. During an acidizing operation, an acid-soluble material in the formation matrix can be dissolved by one or more acids to expand existing flow pathways in the subterranean formation or to create new flow pathways in the subterranean formation. Acid-soluble precipitation damage (i.e., scale) may be removed from the subterranean environment in a related manner. Illustrative substances within the formation matrix that may be dissolved by an acid include, but are not limited to, carbonate materials, siliceous materials, ferrous or ferric materials, or any combination thereof. Introduction of an acidizing fluid to a subterranean formation may take place at matrix flow rates without fracturing of the formation matrix, or at higher injection rates and pressures to fracture the formation matrix (i.e., an acid-fracturing operation).

Carbonate formations can contain minerals, such as calcite or dolomite, which comprise a carbonate anion and a metal counter ion. When acidizing a carbonate formation, the acidity of a treatment fluid alone can often be sufficient to consume the carbonate anion and thereby affect dissolution of the carbonate mineral. Both mineral acids (e.g., hydrochloric acid) and organic acids (e.g., acetic acid and formic acid) can be used to acidize a carbonate formation, often with relatively similar degrees of success. The reaction of such acids with carbonate minerals can generate wormholes and other permeability-enhancing features in the formation matrix. The heterogeneous lithology of carbonate formations can also facilitate the generation of such permeability-enhancing features during an acidizing operation, such as through differential etching and uneven surface dissolution. The increased formation permeability may improve production of a hydrocarbon resource from the formation.

Siliceous formations can include minerals such as, for example, zeolites, clays, and feldspars. As used herein, the term "siliceous" will refer to any substance having the characteristics of silica, including silicates and/or aluminosilicates. The mineral acids and organic acids that are usually effective for dissolving carbonate minerals are generally ineffective for affecting dissolution of siliceous minerals. In contrast, hydrofluoric acid, another mineral acid, can react very rapidly with siliceous materials to promote their dissolution. Additional mineral acids or organic acids may be used in combination with hydrofluoric acid in order to maintain a low pH state as the hydrofluoric acid spends upon reacting with the siliceous material. Unlike the case of carbonate mineral-acidizing operations, the rapid reaction rate of hydrofluoric acid with siliceous minerals can discourage differential etching to form wormhole-like structures and other permeability-enhancing features within the formation matrix. Instead, uniform etching in the near-wellbore area often occurs when acidizing a siliceous mineral by conventional techniques, and the stimulation effect is relatively minimal. In addition, many siliceous, sedimentary minerals, such as shale, sandstone and mudstone, can have low native permeability values that may further discourage deep penetration of an acidizing fluid into the formation matrix. In these and many other unconventional reservoirs, native permeability values may be below about 0.1 millidarcy, often residing in the nanodarcy range, thereby making these reservoirs highly impermeable to fluid flow. When a siliceous formation is unable to be effectively stimulated through an acidizing operation, more costly and technically complex fracturing operations may be needed for effective stimulation to be realized.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

The present disclosure generally relates to subterranean stimulation operations and, more specifically, to treatment fluids and methods for acidizing a siliceous material.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, the rapid reaction rate of siliceous minerals with hydrofluoric acid can make it very difficult to introduce permeability-enhancing features to these substances under typical acidizing conditions, both at matrix flow rates and at injection rates and pressures exceeding the fracture gradient. Due to the rapid reaction rate, dissolution may be confined to the near-wellbore area and stimulation may be precluded at locations further removed from the wellbore. The frequent low permeability and relatively homogeneous character of siliceous minerals may also be problematic in this regard.

Lowering the reaction rate of a siliceous material with hydrofluoric acid might facilitate, in principle, the generation of permeability-enhancing features similar to those observed during acidizing or fracture acidizing of a carbonate material. However, the poor stimulation of siliceous materials under typical acidizing conditions is a function of more than just their rapid reaction rate; the low native permeability, such as that present in unconventional reservoirs, and relative homogeneity of many siliceous materials may be just as problematic toward increasing the permeability of a formation matrix during an acidizing operation. Although hydrofluoric acid precursors may be used to generate hydrofluoric acid in situ and thereby slow the dissolution rate of siliceous materials based largely on the kinetics of hydrofluoric acid production, they, by themselves, may do little to overcome the native lithology of many siliceous materials. Accordingly, hydrofluoric acid precursors would still be expected to affect uniform dissolution at a point of contact with a siliceous material in conventional acidizing operations, albeit at a decreased reaction rate that is primarily limited by the kinetics of hydrofluoric acid production. Furthermore, the high solubility of many hydrofluoric acid precursors under typical acidizing conditions can make localization of the precursor upon a desired portion of the siliceous material difficult due to fluid convection and dilution processes.

To address the foregoing issues, the present inventors discovered facile techniques whereby a hydrofluoric acid precursor may be localized upon a portion of a siliceous material. Once the hydrofluoric acid precursor has been localized, it may be decomposed to hydrofluoric acid and affect differential dissolution of the siliceous material. The differential dissolution of the siliceous material may increase its permeability, similar to that seen during acidizing of a carbonate material.

Specifically, the present inventors discovered that a hydrofluoric acid precursor may be protected within a degradable matrix to form a latent hydrofluoric acid composition that is neutrally or positively buoyant. Following its assembly, the latent hydrofluoric acid composition may be differentially deposited from a treatment fluid upon a portion of a siliceous material without a substantial reaction occurring during deposition. In addition to its feature of neutral or positive buoyancy, the latent hydrofluoric acid composition may be formulated to remain in a non-dissolved or solid form in a treatment fluid, thereby allowing differential deposition upon a siliceous material to take place through diffusive effects without substantial dilution occurring. Without protecting the hydrofluoric acid precursor within the degradable matrix of the latent hydrofluoric acid composition (e.g., by forming a full or partial coating upon the hydrofluoric acid precursor), such deposition conditions would ordinarily be expected to produce hydrofluoric acid rapidly and thwart any attempts at achieving differential deposition, as discussed above. Afterward or concurrently with differential deposition of the latent hydrofluoric acid composition, the degradable matrix may then undergo degradation to expose at least a portion of the hydrofluoric acid precursor to reactive conditions, and the exposed hydrofluoric acid precursor may then convert into hydrofluoric acid. The degradation of the degradable matrix may be induced by a degradant, such as an acid, or occur passively. Due to the localized manner in which the hydrofluoric acid precursor is deposited, coupled with the high reactivity of the generated hydrofluoric acid toward the siliceous material, differential dissolution of the siliceous material may be realized at a location where the latent hydrofluoric acid composition is deposited compared to where it is not. More effective stimulation of the siliceous material may occur than through a uniform dissolution process.

In more particular embodiments, the inventors discovered that the latent hydrofluoric acid composition may be localized within a fracture network defined within the siliceous material. As used herein, the term "fracture network" will refer to a series of interconnected conduits within a subterranean matrix material that are collectively in fluid communication with a wellbore. The interconnected conduits will also be referred to herein as "fractures." Fractures within a subterranean matrix material may be naturally occurring, or they may be manmade. Manmade fractures may be created de novo, or naturally occurring fractures may be extended or expanded by introducing a fluid to a wellbore at or above a fracture gradient pressure of the subterranean matrix material.

More specifically, the inventors discovered that by depositing the latent hydrofluoric acid composition within a fracture network at or above the fracture gradient pressure and subsequently generating hydrofluoric acid therein, the hydrofluoric acid may penetrate significantly further into the formation matrix than in conventional near-wellbore acidizing operations. Once the hydraulic fracturing pressure is released, the fractures can contract from their fracturing-expanded state, thereby effectively trapping the latent hydrofluoric acid composition and localizing it away from the near-wellbore area. This may allow much more effective stimulation to be realized by confining the dissolution process within the fracture network and affecting differential dissolution of the siliceous material as a whole. The fractures in which the latent hydrofluoric acid composition becomes localized may be previously existing fractures, fractures generated de novo during introduction of the latent hydrofluoric acid composition, or any combination thereof.

In addition to promoting more effective stimulation of siliceous materials, the latent hydrofluoric acid compositions and related methods of the present disclosure may provide further advantages as well. From an operational standpoint, keeping the hydrofluoric acid in latent form may avert the handling and safety issues associated with direct use of this acid. Surface corrosion issues may similarly be avoided. In terms of the hydrofluoric acid precursor itself, encapsulation of the precursor within the degradable matrix may lessen potential dust inhalation hazards for operational personnel. Furthermore, a number of degradable matrices are available and may be chosen to tailor the degradation process to a particular set of wellbore conditions that may be present. Finally, the disclosure herein is fully compatible with existing technologies for mitigating re-precipitation of siliceous materials following their dissolution. Further disclosure in regard to the foregoing follows below.

In addition to the advantages described above, the inventors recognized that further benefits may be realized by incorporating various types of fluid loss control particulates within a treatment fluid delivering the latent hydrofluoric acid composition to a siliceous material. The fluid loss control particulates may be co-deposited with the latent hydrofluoric acid composition in similar locations within the siliceous material, or they may penetrate even deeper within a fracture network to promote treatment fluid retention within a desired portion of the subterranean formation. The latent hydrofluoric acid composition can further facilitate placement of the fluid loss control particulates by preventing their reaction with hydrofluoric acid during transport. Fluid loss control may be especially advantageous once etching has taken place within the fracture network to expand the fractures.

In various embodiments, treatment fluids for affecting differential acidizing of a siliceous material are described herein. The treatment fluids may comprise an aqueous carrier fluid, and a latent hydrofluoric acid composition present in a non-dissolved form in the aqueous carrier fluid. The latent hydrofluoric acid composition may comprise a degradable matrix and a hydrofluoric acid precursor dispersed in the degradable matrix. The non-dissolved form of the latent hydrofluoric acid composition may comprise a solid form of the latent hydrofluoric acid composition. In some embodiments, the degradable matrix may form a full or partial coating upon the hydrofluoric acid precursor. In some embodiments, the degradable matrix may be continuous, rather than being in the form of discrete particles.

Suitable aqueous carrier fluids may include, for example, fresh water, treated water, recycled water, ground water, flowback water, produced water, brackish water, acidified water, salt water, seawater, brine (e.g., a saturated salt solution), or an aqueous salt solution (e.g., a non-saturated salt solution). Aqueous carrier fluids may be obtained from any suitable source. Given the benefit of the present disclosure, one of ordinary skill in the art will be able to determine an appropriate aqueous carrier fluid and amount thereof for utilization in the embodiments described herein.

In some embodiments, the aqueous carrier fluid may be chosen such that it is substantially free of alkali metal ions. For purposes of this disclosure, an aqueous carrier fluid or a treatment fluid formed therefrom will be considered to be substantially free of alkali metal ions if less than about 1 wt. % alkali metal ions are present. Choice of an aqueous carrier fluid that is substantially free of alkali metal ions may be desirable in order to limit re-precipitation of alkali metal aluminosilicates, fluorosilicates, and fluoroaluminates following dissolution of a siliceous material. Other features and considerations that may be utilized to mitigate re-precipitation issues following dissolution of a siliceous material are discussed further hereinbelow.

In some embodiments, an organic co-solvent may be included with an aqueous carrier fluid. Suitable organic co-solvents may be miscible with the aqueous carrier fluid and include solvents such as, but not limited to, glycols and alcohols. When present, the amount of the organic co-solvent may range between about 1% to about 50% by volume of the treatment fluid. Considerations for including an organic co-solvent along with an aqueous carrier fluid may include, for example, precluding solubility of the latent hydrofluoric acid composition.

Suitable degradable matrices and their degradation mechanisms are not believed to be particularly limited. For example, in various embodiments, the degradable matrix may degrade under particular pH conditions, oxidative conditions, photolytic conditions, biological conditions, dissolution conditions, or the like. For purposes of this disclosure, dissolution of an initially insoluble material will be considered to constitute degradation. Particular pH conditions may entail acidic conditions or basic conditions depending upon the chosen degradable matrix. In some embodiments, it may be advantageous for the degradable matrix to be acid-degradable, since the degradable matrix may undergo at least partial degradation and the hydrofluoric acid precursor may be converted into hydrofluoric acid under a single set of pH conditions. Particular acid-degradable matrices are discussed hereinbelow.

In some embodiments, the degradable matrix may comprise a degradable polymer. Degradable polymers that may be used in conjunction with the various embodiments of the present disclosure include, for example, polysaccharides, proteins, polyesters (particularly aliphatic polyesters), poly (hydroxyalkanoates), poly(β-hydroxyalkanoates), poly(ω-hydroxy alkanoates), polylactides, polyglycolides, poly(ε-caprolactone)s, poly(hydroxybutyrate)s, poly(alkylene dicarboxylates), polyanhydrides, poly(hydroxy ester ether)s, poly(ether ester)s, poly(ester amide)s, polycarbamates (i.e., polyurethanes), polycarbonates, poly(orthoester)s, poly (amino acid)s, poly(ethylene oxide), polyphosphazenes, polyvinyl alcohol, methyl cellulose, ethyl cellulose, carboxymethyl cellulose, carboxyethyl cellulose, acetyl cellulose, hydroxyethyl cellulose, shellac, dextran, guar, xanthan, starch, a scleroglucan, a diutan, poly(vinyl pyrollidone), polyacrylamide, polyacrylic acid, poly(diallyldimethylammonium chloride), poly(ethylene glycol), polylysine, polymethacrylamide, polymethacrylic acid, poly(vinylamine), any derivative thereof, any copolymer thereof, any salt thereof, and any combination thereof. Copolymers may include random, block, graft, and/or star copolymers in various embodiments.

In more particular embodiments, the degradable polymer may comprise an acid-degradable polymer. In some embodiments, a suitable acid-degradable polymer may comprise a polylactide or an aliphatic polyester. In still more particular embodiments, a suitable acid-degradable polymer may comprise polylactic acid, any derivative thereof, or any combination thereof. The polylactic acid may be of the L-configuration, the D-configuration, or any combination thereof, and the chosen configuration may impact the degradation rate of the degradable matrix. Without being bound by theory or mechanism, the configuration or mixture of configurations of the lactic acid monomers in the polylactic acid may impact the polymer's crystallinity, which may, in turn, affect the degradation rate of the degradable matrix. Combinations of the L- and D-configurations may comprise a racemic mixture, or one configuration may be present in excess over the other. The degradation rate may also be a function of the temperature conditions to which the polylactic acid is exposed. Polylactic acid may be especially advantageous in the context of the present disclosure, since it may help suppress re-precipitation of dissolved silicon compounds by at least partially complexing dissolved metal ions produced upon dissolution of a siliceous material.

In some embodiments, a dehydrated compound may comprise at least a portion of the degradable matrix by slowly hydrating over time and becoming soluble, thereby exposing the hydrofluoric acid precursor in a similar manner to that described above. Dehydrated borates represent illustrative examples of dehydrated compounds that may be used in this regard. Illustrative dehydrated borates can include, for example, anhydrous sodium tetraborate (anhydrous borax) and anhydrous boric acid. These anhydrous borates and others are only slightly soluble in water. However, upon exposure to subterranean temperatures, they can slowly rehydrate and become considerably more soluble over a timeframe of about 8 hours to about 72 hours, depending upon the temperature. In some embodiments, a dehydrated compound may be used in combination with a degradable polymer, a non-degradable polymer or any combination thereof in the degradable matrix in order to convey adequate protection to the hydrofluoric acid-generating compound and to tailor the degradation rate. For example, the polymer may protect the hydrofluoric acid precursor from undergoing a premature reaction, and the solubilization of the dehydrated compound may promote exposure of the hydrofluoric acid precursor to conditions that affect its conversion to hydrofluoric acid.

In some embodiments, an oil-soluble material may comprise at least a portion of the degradable matrix by slowly dissolving over time following exposure to a formation fluid, thereby exposing the hydrofluoric acid precursor in a similar manner to that described above. Suitable oil-soluble materials that may be used in conjunction with the embodiments of the present disclosure include, for example, poly (butadiene), polyisoprene, polyacrylics, polyamides, polyether urethanes, polyester urethanes, and polyolefins (e.g., polyethylene, polypropylene, polyisobutylene, and polystyrene), any copolymer thereof, and any combination thereof.

In various embodiments, a loading of the hydrofluoric acid precursor in the degradable matrix may range between about 1% and about 50% by weight of the latent hydrofluoric acid composition. In more specific embodiments, a loading of the hydrofluoric acid precursor may be between about 5% and about 25% by weight of the latent hydrofluoric acid composition, or between about 5% and about 15% by weight of the latent hydrofluoric acid composition, or between about 1% and about 15% by weight of the latent hydrofluoric acid composition, or between about 1% and about 10% by weight of the latent hydrofluoric acid composition, or between about 5% and about 10% by weight of the latent hydrofluoric acid composition. A loading of the latent hydrofluoric acid composition in the treatment fluid, in turn, may be chosen based upon the amount of the latent hydrofluoric acid composition that needs to be deposited in a given treatment operation.

In some embodiments, the treatment fluids of the present disclosure may further comprise a plurality of fluid loss control particulates in the aqueous carrier fluid. As used herein, the term "fluid loss control particulates" will refer to a solid material having at least one dimension ranging between about 0.1 µm and about 500 µm in size. This size range may represent an equivalent spherical diameter, although the fluid loss control particulates need not necessarily be substantially spherical in shape. In more particular embodiments, the fluid loss control particulates may range between about 0.1 µm and about 150 µm in size, or between about 1 µm and about 100 µm in size. The amount of fluid loss control particulates incorporated within the aqueous carrier fluid may be adjusted to perform a desired function in a subterranean formation, and such considerations will be familiar to one having ordinary skill in the art. For example, the resultant permeability of the subterranean formation and the size of the fractures within its fracture network may dictate, at least in part, the quantity and size of the fluid loss control particulates to include in the treatment fluid. Other than the fluid loss control particulates and the latent hydrofluoric acid composition, the treatment fluids of the present disclosure may be free of other particulates, such as proppant materials or gravel particulates. That is, the latent hydrofluoric acid composition may be deposited within substantially unpropped fractures in various embodiments of the present disclosure.

In more particular embodiments, suitable fluid loss control particulates may comprise fly ash, or they may be formed from fly ash. As used herein, the term "fly ash" will refer to a solid product of combustion that rises with a flue of combustion products. Most often, the term "fly ash" will refer to the fine particulates that are formed during coal combustion, but it is to be recognized that fly ash can also be produced from other sources. Fly ash formed during coal combustion can comprise large amounts of silicon dioxide and calcium oxide. Sieving or other size-based separation techniques can optionally be performed on natively produced fly ash if a specific particle size distribution is needed.

In some or other embodiments, suitable fluid loss control particulates may comprise a particulate material selected from the group consisting of silica flour, fly ash, mica, polymer particulates, cured resin powders, a ceramic microbody, and a glass microbody. As used herein, the term "silica flour" will refer to a fine particulate material comprising silicon dioxide and that is produced by grinding sand or a like siliceous material. Suitable silica flours can include, for example, 325 mesh or 200 mesh silica flours. Glass and ceramic microbodies may include both solid and hollow three-dimensional structures.

Suitable ceramics that may be included in ceramic microbodies include, for example, silicon carbide, aluminum carbide, boron carbide, any combination thereof, and the like. Suitable ceramic microbodies may include, but are not limited to, ceramic microspheres such as N-1000 or N-1200 Zeeospheres (Zeeospheres Ceramics, LLC, which contain a silicon-aluminum ceramic and have 95% of their particles less than 150 microns in size). Other commercially available ceramic microspheres may also be suitable.

Suitable glass microbodies may include glass microspheres such as, but not limited, to HGS10000 and HGS18000 (3M Corporation), which have $95^{th}$ percentile diameters of 65 and 60 microns, respectively, and true density values of 0.63 g/cm$^3$. Other commercially available glass microspheres may also be suitable.

In principle, any hydrofluoric acid precursor can be incorporated within the degradable matrix of the latent hydrofluoric acid composition. In this regard, hydrofluoric acid precursors that may be utilized in the various embodiments of the present disclosure include substances such as, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), perfluorinated organic compounds, titanium fluorides (e.g., $TiF_4$ and $TiF_6^{2-}$), cesium fluoride, boron trifluoride and various boron trifluoride complexes.

In more particular embodiments of the present disclosure, the hydrofluoric acid precursor may comprise a solid material, such as any solid hydrofluoric acid precursor(s) selected from the listing above. Solid hydrofluoric acid precursors may be readily dispersed in the degradable matrix of the latent hydrofluoric acid composition and be substantially protected from undergoing a premature reaction to form hydrofluoric acid. Moreover, under most circumstances, the rheological and buoyancy properties of the latent hydrofluoric acid composition may be determined in substantial part by the properties of the degradable matrix itself in such embodiments, rather than by the hydrofluoric acid precursor. Particularly suitable solid hydrofluoric acid precursors may include, for example, ammonium bifluoride or ammonium fluoride, since these hydrofluoric acid precursors are readily soluble in aqueous fluids and quickly generate hydrofluoric acid upon exposure to an aqueous acid. In addition, these hydrofluoric acid precursors do not contain any elements that represent significant environmental concerns or could lead to potential secondary formation damage.

In alternative embodiments, the latent hydrofluoric acid composition may comprise a liquid hydrofluoric acid precursor or a gaseous hydrofluoric acid precursor. Protection of both of these types of hydrofluoric acid precursors by the degradable matrix may be more difficult than for solid hydrofluoric acid precursors, since liquid or gaseous hydrofluoric acid precursors may be more difficult to isolate from conditions that would otherwise promote their solubilization and/or conversion into hydrofluoric acid.

In some embodiments, the treatment fluid may be foamed in order to promote delivery of the latent hydrofluoric acid composition and/or fluid loss control particulates within a wellbore. Foaming the treatment fluid may minimize settling or loss of these materials at an undesired location. Additionally, foaming the treatment fluid may allow lower treatment fluid volumes to be utilized than would otherwise be possible.

In additional embodiments, the treatment fluids described herein may further comprise any number of additives that are commonly used in downhole operations including, for example, silica scale control additives, chelating agents, surfactants, gel stabilizers, anti-oxidants, polymer degradation prevention additives, relative permeability modifiers, scale inhibitors, foaming agents, defoaming agents, antifoaming agents, emulsifying agents, de-emulsifying agents, iron control agents, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Any combination of these additives may be used as well. Particularly suitable additives for inclusion in the treatment fluids may include those which can mitigate re-precipitation following dissolution of a siliceous material, such as silica scale control additives, chelating agents, and the like. Given the benefit of the present disclosure, one having ordinary skill in the art will be able to formulate a treatment fluid having properties suitable for a given application.

Methods for acidizing a subterranean formation using the latent hydrofluoric acid compositions of the present disclosure are also contemplated herein. When used during an acidizing operation, the latent hydrofluoric acid compositions may be deposited or placed upon a portion of a siliceous material, such that differential dissolution of the siliceous material takes place. Additional disclosure in this regard follows below.

In some embodiments, methods of the present disclosure may comprise: providing a latent hydrofluoric acid composition comprising a degradable matrix, and a hydrofluoric acid precursor dispersed in the degradable matrix; introducing a first treatment fluid containing the latent hydrofluoric acid composition in a non-dissolved form into a wellbore penetrating a subterranean formation comprising a siliceous material; differentially depositing the latent hydrofluoric acid composition upon a portion of the siliceous material in one or more locations; degrading at least a portion of the degradable matrix, thereby exposing at least a portion of the hydrofluoric acid precursor; converting the exposed hydrofluoric acid precursor into hydrofluoric acid; and reacting the hydrofluoric acid with the siliceous material in at least a portion of the one or more locations where the latent hydrofluoric acid composition was deposited.

In some embodiments of the present disclosure, the siliceous material may be present in a reservoir comprising a mineral such as shale, sandstone, mudstone or any combination thereof. In some embodiments, the subterranean formation may comprise a low-permeability variant of these minerals or another type of siliceous mineral. As used herein, the term "low-permeability" will refer to a mineral whose native permeability is about 1 millidarcy or below.

In various embodiments, differentially depositing the latent hydrofluoric acid composition upon a portion of the siliceous material may comprise non-uniformly placing the latent hydrofluoric acid composition on or within the siliceous material. In more particular embodiments, a non-uniform placement of the latent hydrofluoric acid composition may be such that the latent hydrofluoric acid composition is deposited within a fracture network defined in the siliceous material. The fracture network in which the latent hydrofluoric acid composition is deposited may comprise the naturally occurring conduits associated with the native permeability of the siliceous material in some embodiments. In other embodiments, the naturally occurring conduits of a fracture network may be extended or expanded in a fracturing operation, and the latent hydrofluoric acid composition may be deposited therein. In still other embodiments, the conduits within the fracture network may be generated de novo in a fracturing operation, with the latent hydrofluoric acid composition being deposited in the newly generated fractures thereafter.

Facile differential deposition of the latent hydrofluoric acid composition upon the siliceous material may be realized by introducing the first treatment fluid and the latent hydrofluoric acid composition contained therein into the wellbore at or above a fracture gradient pressure of the siliceous material. Under such conditions, any natively present conduits of an existing fracture network in the siliceous material can at least temporarily expand, thereby allowing the latent hydrofluoric acid composition entry thereto. Any newly generated fractures in the siliceous material may similarly receive the latent hydrofluoric acid composition from the wellbore. Upon removing the hydraulic fracturing pressure, the expanded fractures may at least partially close, thereby trapping the latent hydrofluoric acid composition within the fractures or at least slowing its diffusion back into the wellbore. In some embodiments, any residual latent hydrofluoric acid composition remaining in the wellbore may be removed in an overflush, thereby further increasing the differential nature of the deposition process. When present in the first treatment fluid, a plurality of fluid loss control particulates may be deposited similarly within the fracture network in combination with the latent hydrofluoric acid composition.

In alternative embodiments, a pad fluid may precede the first treatment fluid and also be introduced to the wellbore at or above the fracture gradient pressure. As used herein, the term "pad fluid" will refer to a proppant-free treatment fluid that is introduced to a wellbore prior to a larger volume of fracturing fluid containing proppant particulates or a similar type of treatment fluid containing particulates. Once fractures in the siliceous material have been created or extended with the pad fluid, the latent hydrofluoric acid composition of the first treatment fluid may then become localized within the fractures as described hereinabove.

After being differentially deposited upon the siliceous material, hydrofluoric acid may be generated from the latent hydrofluoric acid composition to provide differential etching of the siliceous material. The differential etching may define or modify flow pathways throughout the siliceous material and increase its effective permeability, much like that seen during acidizing of a carbonate material. Following at least partial degradation of the degradable matrix and exposure of the hydrofluoric acid precursor to a reactive environment, the hydrofluoric acid precursor may react readily to generate hydrofluoric acid locally where it is deposited upon the portions of the siliceous material. Accordingly, non-uniform dissolution of the siliceous material may be realized due to the localization of the hydrofluoric acid. Generation of hydrofluoric acid from the latent hydrofluoric acid composition may comprise first degrading at least a portion of the degradable matrix to expose the hydrofluoric acid precursor to a reactive environment (e.g., an acid capable of converting the hydrofluoric acid precursor into hydrofluoric acid).

As discussed above, in some embodiments, the degradable matrix may comprise an acid-degradable matrix, such as an acid-degradable polymer. Specific examples of acid-degradable polymers are provided above. Accordingly, in certain embodiments, degrading the degradable matrix may comprise contacting an acid-degradable polymer in the degradable matrix with an aqueous acid. An acid-generating compound may be used similarly in this regard. The aqueous acid may comprise any organic or mineral acid that is present in a concentration suitable to degrade the acid-degradable polymer at a chosen rate.

The methods of the present disclosure allow considerable flexibility to be realized in how an acid is contacted with an acid-degradable polymer or other acid-degradable matrix. In some embodiments, the first treatment fluid may further comprise an acid, an acid-generating compound or any combination thereof, with the acid or generated acid promoting degradation of the acid-degradable polymer and ensuing conversion of the exposed hydrofluoric acid precursor into hydrofluoric acid. Although it might seem counterintuitive to include an acid source in the same treatment fluid with an acid-degradable polymer or other acid-degradable matrix, the acid-degradable polymer or matrix may persist long enough after being combined with the acid such that the latent hydrofluoric acid composition can still be delivered downhole effectively. The acid concentration and the particular acid-degradable polymer, for example, may be chosen to attain a suitable degradation rate for delivery under a particular set of downhole and pH conditions. Among other factors, the temperature of the subterranean formation may be considered when assessing the degradation rate under a particular set of conditions. Inclusion of an acid or an acid-generating compound in the first treatment fluid in combination with the latent hydrofluoric acid composition may limit the number of treatment stages needing to be performed, thereby helping to limit costs of the acidizing operation.

In alternative embodiments, methods of the present disclosure may further comprise introducing a second treatment fluid comprising an acid, an acid-generating compound, or any combination thereof into the wellbore after the latent hydrofluoric acid composition has been differentially deposited. Utilization of a second treatment fluid to induce degradation of the degradable matrix may be desirable when a more lengthy delay is needed for releasing hydrofluoric acid than can be realized by including an acid or acid-generating compound in the first treatment fluid in combination with the latent hydrofluoric acid composition.

Particular examples of acids suitable for inclusion in the first treatment fluid and/or the second treatment fluid may include, but are not limited to, hydrochloric acid, hydrobromic acid, formic acid, acetic acid, chloroacetic acid, dichloroacetic acid, trichloroacetic acid, fluoroacetic acid, difluoroacetic acid, trifluoroacetic acid, methanesulfonic acid, citric acid, maleic acid, glycolic acid, lactic acid, malic acid, oxalic acid, the like, and any combination thereof. Examples of suitable acid-generating compounds may include, but are not limited to, esters, aliphatic polyesters, orthoesters, poly(orthoesters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, the like, any derivative thereof, and any combination thereof.

The particular acid-degradable material comprising the degradable matrix may dictate the chosen acid or acid-generating compound and its concentration. Mineral acids may be present in the treatment fluids in an amount ranging between about 1% and about 20% of the treatment fluid by weight, or in an amount ranging between about 1% and about 15% of the treatment fluid by weight, or in an amount ranging between about 5% and about 10% of the treatment fluid by weight. Higher mineral acid concentrations may be used as well. Since organic acids are generally less acidic than are mineral acids, the organic acids may comprise up to about 25% of a treatment fluid by weight, particularly between about 1% and about 25% of the treatment fluid by weight, or between about 10% and about 20% of the treatment fluid by weight. Acid-generating compounds may be used to produce acids at similar concentration values. The treatment fluids can have a pH value of about 4 or lower, or about 3.5 or lower, or about 3 or lower, or about 2.5 or lower, or about 2 or lower, or about 1.5 or lower, or about 1 or lower. In more particular embodiments, the pH may range between about 0 and about 4, or between about 1 and about 4, or between about 1 and about 3, or between about 2 and about 4.

Accordingly, in other various embodiments of the present disclosure, methods for differentially acidizing a siliceous material may comprise: introducing a first treatment fluid containing a latent hydrofluoric acid composition into a wellbore penetrating a subterranean formation comprising a siliceous material, the latent hydrofluoric acid composition being present in a non-dissolved form in the first treatment fluid and comprising an acid-degradable matrix, and a hydrofluoric acid precursor dispersed in the acid-degradable matrix; depositing at least a portion of the latent hydrofluoric acid composition within a fracture network defined in the siliceous material; contacting the latent hydrofluoric acid composition with an acid, thereby degrading at least a portion of the acid-degradable matrix, exposing at least a portion of the hydrofluoric acid precursor, and converting the exposed hydrofluoric acid precursor into hydrofluoric acid; and reacting the hydrofluoric acid within the fracture network of the siliceous material to increase a permeability of the subterranean formation.

As one of ordinary skill in the art will recognize and as referenced in brief above, various issues with re-precipitation can be encountered in the course of acidizing a siliceous material. Without limitation, issues that can be encountered include re-precipitation of siliceous compounds once the solubility limit of dissolved silicon has been exceeded, formation of highly insoluble alkali metal fluorosilicates or alkali metal fluoroaluminates in the presence of alkali metal ions, formation of calcium fluoride, and any combination thereof. Depending on the actual conditions present in a given subterranean formation, a particular re-precipitation pathway may be predominant. Illustrative strategies to address these precipitation issues are discussed in brief hereinafter, each of which is compatible for use in conjunction with the latent hydrofluoric acid compositions described herein. Other precipitation-control strategies may also be appropriate and compatible with the latent hydrofluoric acid composition, and the listed strategies should be considered to be non-limiting examples of those that may be employed.

In some embodiments, a silica scale control additive may be used in conjunction with the latent hydrofluoric acid composition. As used herein, the term "silica scale control additive" will refer to a substance that limits deposition of amorphous, gelatinous and/or colloidal silica that leads to silica scale buildup. Illustrative silica scale control additives that may be used in this regard include, but are not limited to, polyaminoamide dendrimers, polyethyleneimine, carboxymethylinulin, polyacrylates, phosphonates, aminocarboxylic acids, polyaminocarboxylic acids, and ortho-dihydroxybenzene compounds related to tannic acid. When used, a silica scale control additive may be present in the first treatment fluid in combination with the latent hydrofluoric acid composition or in a treatment fluid introduced to the wellbore separately from the latent hydrofluoric acid composition.

In many instances, a carbonate material may be present in conjunction with a siliceous material in a subterranean formation. For example, sandstone deposits may contain about 1% to about 35% carbonates in addition to the predominant siliceous material. Upon dissolution, the carbonate material can provide metal ions that may lead to precipitation, either by themselves or in the presence of fluoride ions from hydrofluoric acid. For example, calcium ions can react readily with fluoride ions to form highly insoluble and damaging calcium fluoride. Aluminum ions resulting from dissolution of aluminosilicates can also represent a troubling source of precipitation, particularly in the presence of alkali metal ions.

Accordingly, in some embodiments, a chelating agent may be used in conjunction with the latent hydrofluoric acid composition. The chelating agent may complex metal ions and render them inactive such that they are no longer able to react to form insoluble compounds. As used herein, the terms "complex," "complexing," "connplexation" and other grammatical variants thereof will refer to the formation of a metal-ligand bond. Although complexation of a metal ion may involve a chelation process in some embodiments, complexation is not deemed to be limited in this manner. When used, a chelating agent may be present in the first treatment fluid in combination with the latent hydrofluoric acid composition or in a treatment fluid introduced to the wellbore separately from the latent hydrofluoric acid composition. Aminopolycarboxylic acid chelating agents may be particularly advantageous chelating agents for use in the embodiments disclosed herein.

In other various embodiments, systems configured for delivering a treatment fluid of the present disclosure to a downhole location are described herein. In various embodiments, the systems can comprise a pump fluidly coupled to a tubular, the tubular containing a treatment fluid comprising an aqueous carrier fluid, and a latent hydrofluoric acid composition present in a non-dissolved form in the aqueous carrier fluid. The latent hydrofluoric acid composition may comprise a degradable matrix and a hydrofluoric acid precursor dispersed in the degradable matrix.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce a treatment fluid of the present disclosure to a subterranean formation at or above a fracture gradient of the subterranean formation, but it may also be used in cases where fracturing is not desired. The treatment fluids described herein may be introduced with a high pressure pump, or they may be introduced following a treatment fluid that was introduced with a high pressure pump. In some embodiments, the high pressure pump may be capable of fluidly conveying particulate matter into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of a treatment fluid before it reaches the high pressure pump. Alternately, the low pressure pump may be used to directly introduce the treatment fluid to the subterranean formation.

In some embodiments, the systems described herein can further comprise a mixing tank that is upstream of the pump and in which the latent hydrofluoric acid composition is formulated with a carrier fluid. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 1:
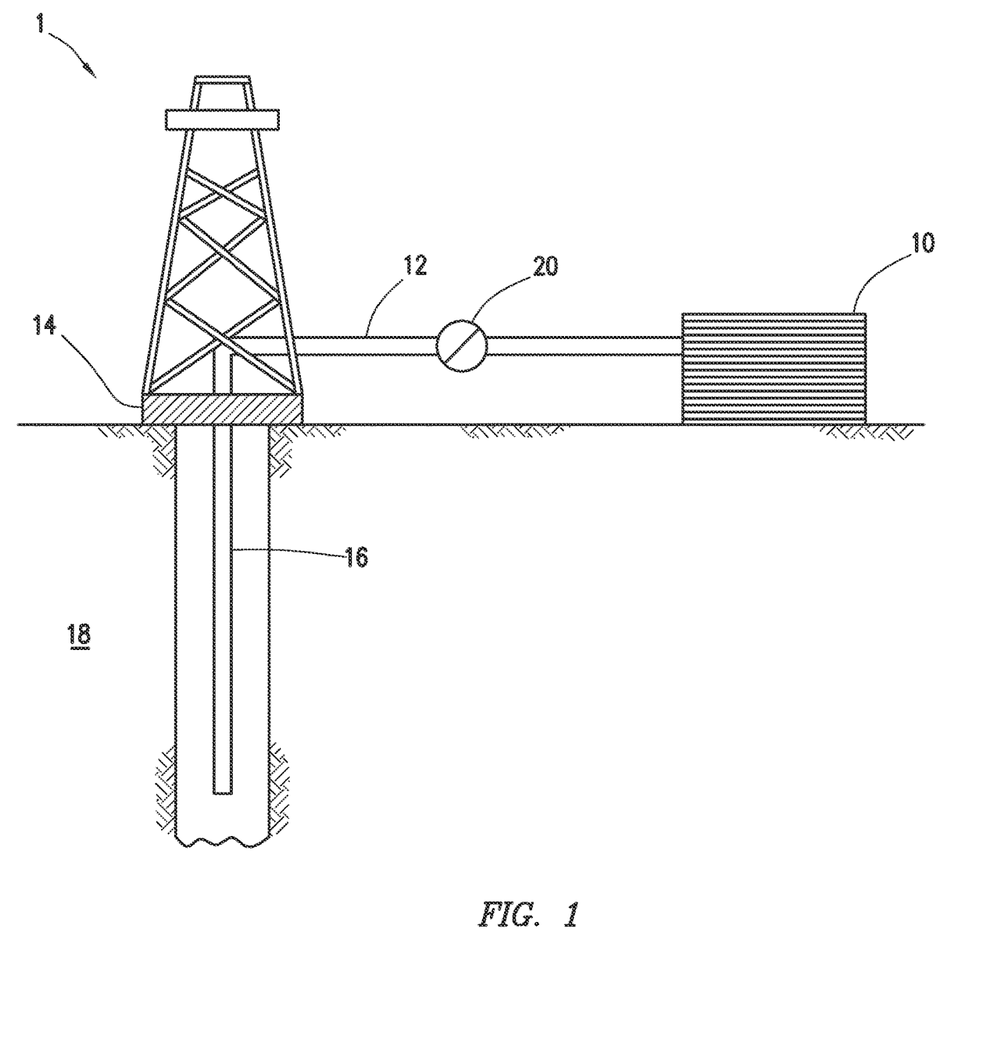
FIG. 1 shows an illustrative schematic of a system that can deliver treatment fluids of the present disclosure to a downhole location, according to one or more embodiments.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. For example, the treatment fluid may be delivered to the downhole location of a subsea wellbore using a subsea riser structure. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Tubular 16 may include orifices that allow the treatment fluid to enter into the wellbore. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may flow back to wellhead 14 in a produced hydrocarbon fluid from subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. Methods for acidizing a siliceous material. The methods comprise: providing a latent hydrofluoric acid composition comprising a degradable matrix, and a hydrofluoric acid precursor dispersed in the degradable matrix; introducing a first treatment fluid containing the latent hydrofluoric acid composition in a non-dissolved form into a wellbore penetrating a subterranean formation comprising a siliceous material; differentially depositing the latent hydrofluoric acid composition upon a portion of the siliceous material in one or more locations; degrading at least a portion of the degradable matrix, thereby exposing at least a portion of the hydrofluoric acid precursor; converting the exposed hydrofluoric acid precursor into hydrofluoric acid; and reacting the hydrofluoric acid with the siliceous material in at least a portion of the one or more locations where the latent hydrofluoric acid composition was deposited.

B. Methods for acidizing a siliceous material. The methods comprise: introducing a first treatment fluid containing a latent hydrofluoric acid composition into a wellbore penetrating a subterranean formation comprising a siliceous material, the latent hydrofluoric acid composition being present in a non-dissolved form in the first treatment fluid and comprising an acid-degradable matrix, and a hydrofluoric acid precursor dispersed in the acid-degradable matrix; depositing at least a portion of the latent hydrofluoric acid composition within a fracture network defined in the siliceous material; contacting the latent hydrofluoric acid composition with an acid, thereby degrading at least a portion of the acid-degradable matrix, exposing at least a portion of the hydrofluoric acid precursor, and converting the exposed hydrofluoric acid precursor into hydrofluoric acid; and reacting the hydrofluoric acid within the fracture network of the siliceous material to increase a permeability of the subterranean formation.

C. Treatment fluids comprising a latent hydrofluoric acid composition. The treatment fluids comprise: an aqueous carrier fluid; and a latent hydrofluoric acid composition present in a non-dissolved form in the aqueous carrier fluid, the latent hydrofluoric acid composition comprising a degradable matrix, and a hydrofluoric acid precursor dispersed in the degradable matrix.

D. Systems for introducing a latent hydrofluoric acid composition into a wellbore. The systems comprise: a pump fluidly coupled to a tubular, the tubular containing a treatment fluid comprising an aqueous carrier fluid, and a latent hydrofluoric acid composition present in a non-dissolved form in the aqueous carrier fluid, the latent hydrofluoric acid composition comprising a degradable matrix, and a hydrofluoric acid precursor dispersed in the degradable matrix.

Each of embodiments A-D may have one or more of the following additional elements in any combination:

Element 1: wherein the degradable matrix is acid-degradable.

Element 2: wherein the degradable matrix comprises an acid-degradable polymer.

Element 3: wherein the acid-degradable polymer comprises polylactic acid, any derivative thereof, or any combination thereof.

Element 4: wherein the first treatment fluid further comprises an acid, an acid-generating compound, or any combination thereof.

Element 5: wherein the method further comprises introducing a second treatment fluid comprising an acid, an acid-generating compound, or any combination thereof into the wellbore after differentially depositing the latent hydrofluoric acid composition.

Element 6: wherein the hydrofluoric acid precursor comprises a solid material.

Element 7: wherein the siliceous material is present in a reservoir comprising a mineral selected from the group consisting of shale, sandstone, mudstone, and any combination thereof.

Element 8: wherein the latent hydrofluoric acid composition is deposited within a fracture network defined in the siliceous material.

Element 9: wherein the first treatment fluid is introduced into the wellbore at or above a fracture gradient pressure of the siliceous material.

Element 10: wherein the first treatment fluid further comprises a plurality of fluid loss control particulates, the plurality of fluid loss control particulates being deposited within the fracture network in combination with the latent hydrofluoric acid composition.

Element 11: wherein the first treatment fluid further comprises the acid, an acid-generating compound, or any combination thereof.

Element 12: wherein the method further comprises introducing a second treatment fluid comprising the acid, an acid-generating compound, or any combination thereof into the wellbore after depositing the latent hydrofluoric acid composition within the fracture network.

Element 13: wherein the first treatment fluid further comprises a plurality of fluid loss control particulates, the plurality of fluid loss control particulates being deposited within the fracture network in combination with the latent hydrofluoric acid composition.

Element 14: wherein the treatment fluid further comprises a plurality of fluid loss control particulates in the aqueous carrier fluid.

By way of non-limiting example, exemplary combinations applicable to A-D include:

The method of A in combination with elements 2 and 4.
The method of A in combination with elements 2 and 5.
The method of A in combination with elements 2 and 6.
The method of A in combination with elements 1 and 7.
The method of A in combination with elements 4 and 7.
The method of A in combination with elements 5 and 7.
The method of A in combination with elements 3 and 4.
The method of A in combination with elements 3 and 5.
The method of A in combination with elements 6 and 10.
The method of A in combination with elements 8 and 10.
The method of A in combination with elements 7 and 8.
The method of A in combination with elements 8 and 9.
The method of A in combination with elements 1 and 10.
The method of A in combination with elements 3 and 10.
The method of A in combination with elements 3, 4 and 6.
The method of A in combination with elements 3, 5 and 6.
The method of B in combination with elements 2 and 3.
The method of B in combination with elements 2 and 4.
The method of B in combination with elements 2 and 5.
The method of B in combination with elements 7 and 11.
The method of B in combination with elements 7 and 12.
The method of B in combination with elements 3 and 11.
The method of B in combination with elements 3 and 12.
The method of B in combination with elements 3 and 10.
The method of B in combination with elements 6 and 10.
The method of B in combination with elements 9 and 10.
The treatment fluid of C or the system of D in combination with elements 1 and 2.
The treatment fluid of C or the system of D in combination with elements 2 and 3.
The treatment fluid of C or the system of D in combination with elements 1 and 6.
The treatment fluid of C or the system of D in combination with elements 2 and 6.
The treatment fluid of C or the system of D in combination with elements 4 and 10.
The treatment fluid of C or the system of D in combination with elements 6 and 10.

To facilitate a better understanding of the embodiments of the present disclosure, the following examples of preferred or representative embodiments are given. In no way should the following examples be read to limit, or to define, the scope of the disclosure.

EXAMPLES

Example 1: Treatment of a Shale Core with a Latent

Figure 2:
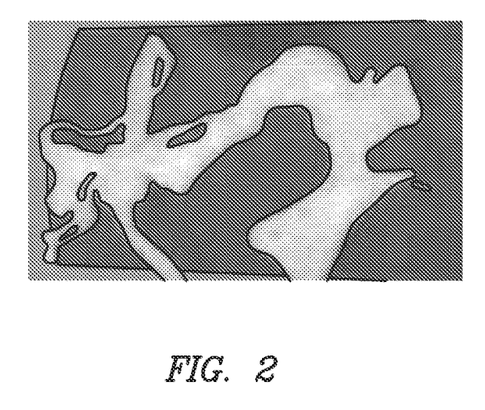
FIG. 2 shows an image of a latent hydrofluoric acid composition deposited in a pattern on a split core.
Figure 3:
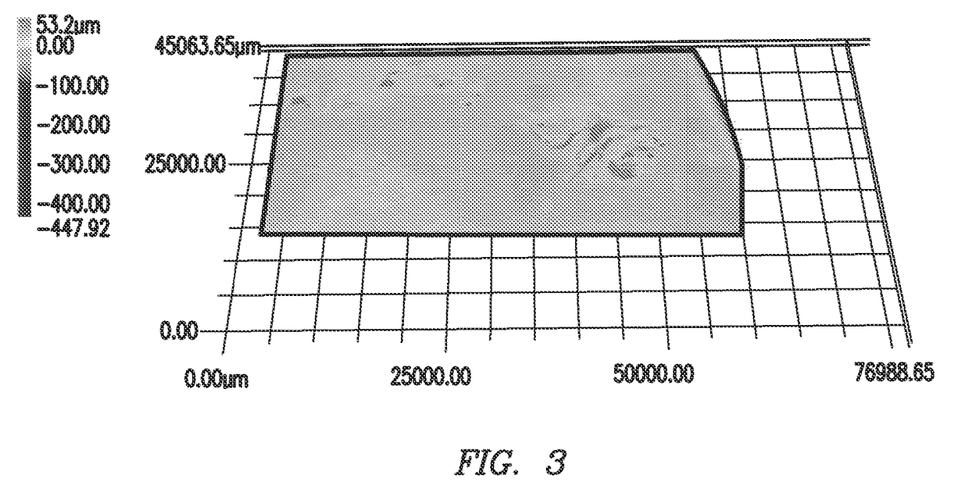
FIG. 3 shows an illustrative profilometry plot following differential etching of a split core.

Hydrofluoric Acid Composition. A Marcellus shale core sample was cut in two halves, and each half was polished to a smooth finish. Control: Polylactic acid (PLA) was sandwiched between the two halves of the core sample. The two halves were then bound tightly together to simulate a fracture, and the bound core plus PLA was placed in a 15% HCl solution at 200° F. for 16 hours. No etching or pitting of the core sample was observed following the heating period. Experimental: A latent hydrofluoric acid composition was prepared by mixing a 1:1 weight ratio of PLA and ammonium bifluoride in methylene chloride. The thick slurry was then placed in a "pattern" upon a surface of the split core, and the methylene chloride was allowed to evaporate. The two halves of the split core were then bound together to simulate a fracture. FIG. 2 shows an image of the latent hydrofluoric acid composition deposited in a pattern on the split core. The "pattern" was maintained upon evaporation of the methylene chloride and after binding the two core halves together. As in the control sample, the two halves of the split core sample were then bound together to constrain the latent hydrofluoric acid composition within a simulated fracture. The bound core plus the latent hydrofluoric acid composition was similarly placed in 15% HCl at 200° F. overnight. Unlike the control sample, visually distinct pitting and etching was observed upon the portions of the core face where the latent hydrofluoric acid composition was initially present. FIG. 3 shows an illustrative profilometry plot following differential etching of the split core. The locations of more intense grayscale color variation indicate where the most etching occurred. The etching regions closely matched the "pattern" of the deposited latent hydrofluoric acid composition (FIG. 2).

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
providing a latent hydrofluoric acid composition comprising a degradable matrix, and a hydrofluoric acid precursor dispersed in the degradable matrix, wherein the hydrofluoric acid precursor is selected from the group consisting of: fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts, perfluorinated organic compounds, $TiF_4$, $TiF_6^{2-}$, cesium fluoride, boron trifluoride, boron trifluoride complexes, or combinations thereof;
introducing a first treatment fluid containing the latent hydrofluoric acid composition in a non-dissolved form into a wellbore penetrating a subterranean formation comprising a siliceous material;
differentially depositing the latent hydrofluoric acid composition upon a portion of the siliceous material in one or more locations;
degrading at least a portion of the degradable matrix, thereby exposing at least a portion of the hydrofluoric acid precursor;
converting the exposed hydrofluoric acid precursor into hydrofluoric acid; reacting the hydrofluoric acid with the siliceous material in at least a portion of the one or more locations where the latent hydrofluoric acid composition was de posited; and
introducing a second treatment fluid comprising an acid, an acid-generating compound, or any combination thereof of the acid and the acid-generating compound into the wellbore after differentially depositing the latent hydrofluoric acid composition;
wherein the acid comprises at least one acid selected from the group consisting of hydrochloric acid, hydrobromic acid, formic acid, acetic acid, chloroacetic acid, dichloroacetic acid, trichloroacetic acid, fluoroacetic acid, difluoroacetic acid, trifluoroacetic acid, methanesulfonic acid, citric acid, maleic acid, glycolic acid, lactic acid, malic acid, oxalic acid, and combinations thereof; and wherein the acid generating compound comprises at least one material selected from the group consisting of esters, orthoesters, poly(orthoesters), poly(lactides), poly(glycolides), poly(e-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, and combinations thereof;
wherein the first treatment fluid does not comprise the acid or the acid generating compound of the second treatment fluid.

2. The method of claim 1, wherein the degradable matrix is acid-degradable.

3. The method of claim 2, wherein the degradable matrix comprises an acid-degradable polymer.

4. The method of claim 3, wherein the acid-degradable polymer comprises polylactic acid, any derivative thereof, or any combination thereof.

5. The method of claim 2, wherein the first treatment fluid further comprises an acid, an acid-generating compound, or any combination thereof.

6. The method of claim 1, wherein the hydrofluoric acid precursor comprises a solid material.

7. The method of claim 1, wherein the siliceous material is present in a reservoir comprising a mineral selected from the group consisting of shale, sandstone, mudstone, and any combination thereof.

8. The method of claim 1, wherein the latent hydrofluoric acid composition is deposited within a fracture network defined in the siliceous material.

9. The method of claim 8, wherein the first treatment fluid is introduced into the wellbore at or above a fracture gradient pressure of the siliceous material.

10. The method of claim 8, wherein the first treatment fluid further comprises a plurality of fluid loss control particulates, the plurality of fluid loss control particulates being deposited within the fracture network in combination with the latent hydrofluoric acid composition.

11. A method comprising:
introducing a first treatment fluid containing a latent hydrofluoric acid composition into a wellbore penetrating a subterranean formation comprising a siliceous material, the latent hydrofluoric acid composition being present in a non-dissolved form in the first treatment fluid and comprising an acid-degradable matrix, and a hydrofluoric acid precursor dispersed in the acid-degradable matrix, wherein the hydrofluoric acid precursor is selected from the group consisting of: fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts, perfluorinated organic compounds, $TiF_4$, $TiF_6^{2-}$, cesium fluoride, boron trifluoride, boron trifluoride complexes, or combinations thereof;
depositing at least a portion of the latent hydrofluoric acid composition within a fracture network defined in the siliceous material;
contacting the latent hydrofluoric acid composition with an acid, thereby degrading at least a portion of the acid-degradable matrix, exposing at least a portion of the hydrofluoric acid precursor, and converting the exposed hydrofluoric acid precursor into hydrofluoric acid;
reacting the hydrofluoric acid within the fracture network of the siliceous material to increase a permeability of the subterranean formation; and
introducing a second treatment fluid comprising an acid, an acid-generating compound, or any combination thereof of the acid and the acid-generating compound into the wellbore after differentially depositing the latent hydrofluoric acid composition;
wherein the acid comprises at least one acid selected from the group consisting of hydrochloric acid, hydrobromic acid, formic acid, acetic acid, chloroacetic acid, dichloroacetic acid, trichloroacetic acid, fluoroacetic acid, difluoroacetic acid, trifluoroacetic acid, methanesulfonic acid, citric acid, maleic acid, glycolic acid, lactic acid, malic acid, oxalic acid, and combinations thereof; and wherein the acid generating compound comprises at least one material selected from the group consisting of esters, orthoesters, poly(orthoesters), poly(lactides), poly(glycolides), poly(e-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, and combinations thereof;
  wherein the first treatment fluid does not comprise the acid or the acid generating compound of the second treatment fluid.

12. The method of claim 11, wherein the acid-degradable matrix comprises an acid-degradable polymer.

13. The method of claim 12, wherein the acid-degradable polymer comprises polylactic acid, any derivative thereof, or any combination thereof.

14. The method of claim 11, wherein the first treatment fluid further comprises the acid, an acid-generating compound, or any combination thereof.

15. The method of claim 11, wherein the hydrofluoric acid precursor comprises a solid material.

16. The method of claim 11, wherein the siliceous material is present in a reservoir comprising a mineral selected from the group consisting of shale, sandstone, mudstone, and any combination thereof.

17. The method of claim 11, wherein the first treatment fluid is introduced into the wellbore at or above a fracture gradient pressure of the siliceous material.

18. The method of claim 11, wherein the first treatment fluid further comprises a plurality of fluid loss control particulates, the plurality of fluid loss control particulates being deposited within the fracture network in combination with the latent hydrofluoric acid composition.

* * * * *